May 16, 1967

C. L. WILSON ETAL 3,319,937

APPARATUS FOR MAKING FOAMS

Original Filed May 16, 1956

INVENTORS
CHRISTOPHER L. WILSON
DON G. HUTTON

BY
Richard K Parsell
ATTORNEY

United States Patent Office 3,319,937
Patented May 16, 1967

3,319,937
APPARATUS FOR MAKING FOAMS
Christopher L. Wilson, Sloatsburg, and Don G. Hutton, Yonkers, N.Y., assignors to Hudson Foam Plastics Corporation, Edgewater, N.J., a corporation of New York
Original application May 16, 1956, Ser. No. 585,298. Divided and this application Sept. 15, 1960, Ser. No. 80,712
7 Claims. (Cl. 259—8)

This invention relates to a method of making foamed products from selected chemical reactants, and apparatus for carrying out such method.

The present application is a division of application Ser. No. 585,298, filed May 16, 1956, now United States Patent No. 3,012,977.

It has been proposed to make foams from liquid plastic materials, or mixtures of liquid materials which are adapted to react chemically to produce porous resinous or plastic materials. The pores of the plastic foam are produced by gases evolved by either chemical reaction or by the change of state of liquids held either in solution or in a dispersion at a temperature above their boiling point.

In accordance with the instant invention, a foamed product is formed from two or more essential liquid components which are precisely metered and delivered to a central mixing head where rapid and thorough intermingling of the components take place; such mixing operation occuring immediately prior to ejection of the mixture from the head in the form of a steady stream at a predetermined and controllable pressure; the stream being passed into a mold or other suitable receptacle wherein the foaming action takes place. When gaseous solutes are used, the foaming action takes place as the stream of material leaves the exit nozzle of the mixing head, while with the use of chemical reactions to produce the foaming gas, foaming occurs more slowly in most cases and proceeds to a large extent in the mold.

Concomitant with, or soon after foaming, it is necessary that the liquid resin mixture shall gel or cure. It is important that the rates of foaming and curing shall be precisely controlled in order to achieve the type of foamed product desired.

Furthermore, in accordance with the instant invention, the mixing of the liquid components in the mixing head is conducted at relatively low pressure. Preferably, such pressures are of the order of 300 p.s.i. or less and may be as little as 50 or 60 p.s.i. With the use of such relatively low mixing pressures, in contrast to the relatively high mixing pressures known in the art; it is possible to achieve a number of desirable objectives.

Thus, with low mixing pressures, pumps are easier to operate and maintain. Furthermore, the pore size of the foamed product may be controlled by regulation of the speed of the stirring member in the mixing head. Additionally, the mixing head may be of such construction as to allow the interior thereof to be substantially free of deleterious matter which would adversely affect the foamed products made with such mixing head.

Accordingly, one object of this invention is to provide an improved method of mixing liquid reactive components under conditions which facilitates the manufacture of foamed products derived from such components; which allows precise control of the pore size of the foams; which permits the use of various combinations of reactive components having varying rates of reactivity; and which results in economy of operation.

Another object of this invention is to provide an improved apparatus for mixing the liquid components in accordance with the method of the instant invention, such apparatus being of relatively simple construction, which is easily maintained and comprises a minimum number of parts.

Other objects of this invention will in part be obvious and in part hereinafter pointed out.

The method and apparatus of the instant invention involve the formation of foamed products from liquid components which are rapidly mixed and deposited into a suitable mold. As one example, such liquid components may comprise (1) a polyester, (2) a diisocyanate or a mixture of diioscyanates, and (3) a catalyst such as a tertiary amine in combination with water. In another case, the foam may be produced by the reaction of (1) a solution of polyvinyl alcohol in water containing a foam stabilizing agent, (2) a sulfuric acid solution containing dissolved formaldehyde, and (3) a saturated aqueous solution of sodium bicarbonate.

Such liquid components are delivered to a mixing head from individual metering pumps which are capable of delivering the separate components to the head steadily at a non-fluctuating rate and at pressures up to about 300 p.s.i. and preferably as low as 50–60 p.s.i. through suitable flexible conduits. The inlets of such conduits are arranged on the head in accordance with the nature of the several components and the chemical reactions involved. One such inlet is located at the top of the head or adjacent thereto and off center to provide space for the shaft carrying the mixing paddles. A second inlet may be located immediately below the first inlet or at a suitable point intermediate the top and bottom of the mixing head, as determined by the nature of the chemical reaction, while the third inlet may be located at a lower point on said head and suitably related to the other inlets.

The mixing head may be of cylindrical or spherical shape with a capacity ranging up to about 2 liters and with a preferred capacity of the order of ½ liter. It is understood that the size of the head is related to the speed of reactions which commence therein after the components are mixed and which continue when the mixture is deposited from the outlet of the head onto the mold or a continuously moving belt. The head is made of suitable materials resistant to the chemicals involved, and may be formed of various acid resistant stainless steels.

Figure 1:
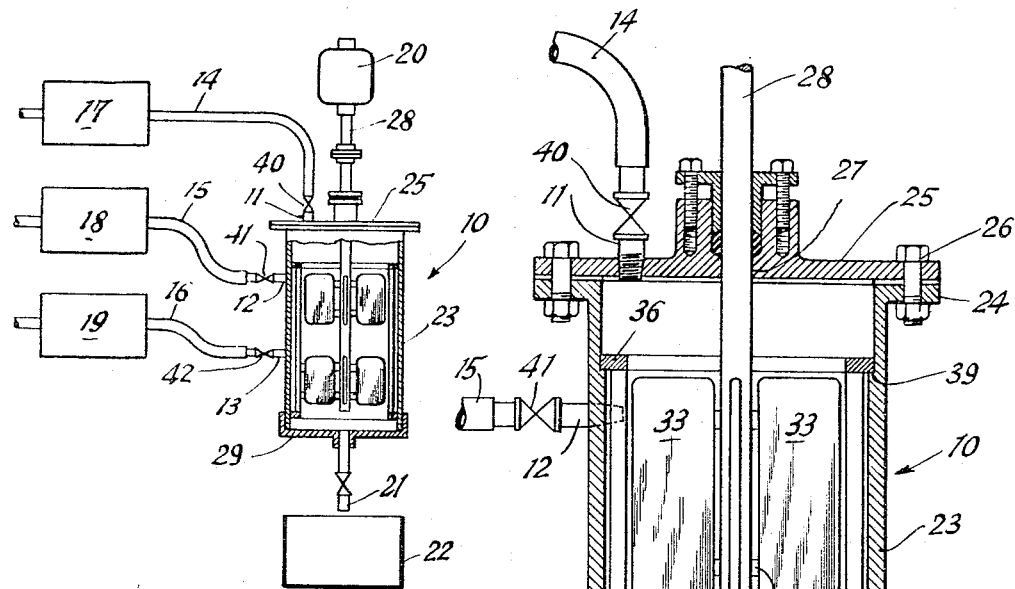
FIG. 1 is a diagramatic showing of the apparatus for making foam, in accordance with the instant invention.

Referring in detail to the drawing, and particularly to FIG. 1, 10 designates a mixing head embodying the invention and operating in accordance with the method of the invention. Such head is provided with liquid inlets 11, 12 and 13, which are connected by flexible conduits 14, 15, 16 respectively, to metering pumps generally indicated at 17, 18, 19 respectively.

The mixing head 10 has rotatably mounted therein paddles, described later in detail, which are rotated by means of a motor 20 suitably coupled to a shaft carrying such paddles. A valved outlet 21 at the lower end of head 10 delivers the mixed components to a mold generally indicated 22, such mold being either of the stationary or movable type. The movable type of mold is carried by a moving belt, not shown, in a manner known in the art.

Figure 2:
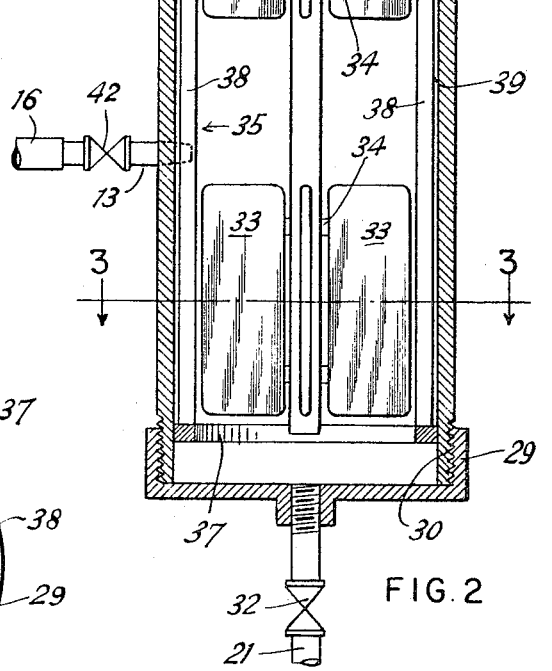
FIG. 2 is a vertical sectional view of a mixing head embodying the invention.
Figure 3:
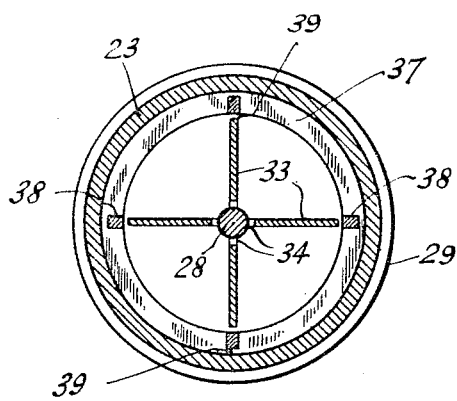
FIG. 3 is a transverse sectional view taken on the line 2—2 of FIG. 1.

As shown in FIG. 2, the mixing head 10 comprises a cylindrical walled portion 23, with a flange 24 at the upper end thereof, to which a cover plate 25 may be bolted as at 26. The plate 25 is formed with a central opening 27 to pass a paddle shaft 28 therethrough, and the offset inlet member 11. A flanged bottom plate 29 is screwed onto the threaded lower end 30 of walled portion 23, said bottom plate having the outlet nozzle 21 centrally disposed thereof, with a valve 32 arranged therein.

Paddle members 33 are fixed to axially disposed shaft 28, such members being conveniently arranged in upper and lower groups of four each; the individual members in each group being disposed at 90° intervals. The paddle members 33 may be of flat, rectangular shape and are secured in spaced relation to shaft 28 by spacer pins 34.

Baffle means generally indicated at 35, is located on the inner surface of wall 23, such means being in removable cage form comprising upper and lower rings 36, 37 interconnected by vertically disposed baffle members 38 of rectangular shape and located at 90° intervals.

The upper end of wall 23 is formed with an annular shoulder 39 for seating a radially projecting portion of upper ring 36 of baffle means 35, ring 37 projecting radially with respect to the outer edge of baffle member 38 thereby properly locating the baffle means within the mixing head and providing spaces 39 between the inner surface of wall 23 and the adjacent baffle members 38. A radial projection on ring 36, not shown, receivable in a notch in wall 23, not shown, prevents rotation of the cage 35 relative to wall 23.

When using the mixing head for making a polyvinyl formal foam, an aqueous solution of polyvinyl alcohol containing a foam stabilizing agent is introduced from a supply tank, not shown, into the head 10 by means of pump 17, conduit 14 and upper inlet 11. An aqueous solution of sulfuric acid of a concentration ranging between 40% and 70% and containing dissolved formaldehyde, is introduced from a supply tank, not shown, into head 10 by way of pump 18, conduit 15 and inlet 12. Finally, a saturated aqueous solution of sodium bicarbonate is introduced from a supply tank, not shown, into head 10 by means of pump 19, conduit 16 and inlet 13. Pressure is maintained within head 10 by appropriate settings on pumps 17, 18 and 19 and suitable regulation of outlet valve 32. Thus, carbon dioxide derived from the bicarbonate solution is kept in solution until the liquid is expelled from outlet 21.

The resultant foam is received in mold 22 where the same is cured by heating, thus forming a porous mass having intercommunicating pores. It has been found that the pore size may be carefully controlled by regulating the rotational speed of paddles 33. With the inlets 11, 12 and 13 in closely spaced relation, the successively introduced liquids are dispersed one in the other at a very rapid rate so that the solution of the initially formed droplets has time to take place during further passage through head 10.

The rate of solution of droplets in a given medium is increased as the droplet size decreases. With low pressure conditions in head 10, the paddles 33 moving in relation to baffle members 38, with a relatively small clearance therebetween, provide a shearing effect on the mixture of liquid components moving through the head, thereby effecting the desired dispersing action of the later introduced components with respect to the earlier introduced components.

The baffle members 18 furthermore increase turbulence within the head and minimize laminar flow and motion of the several liquid components, thereby materially increasing mixing efficiency. If chemical reaction occurs after the mixing of the components, it has been found that the size of the pores in the foamed product depends on the droplet size of the dispersed liquids. If complete solution occurs, pores of minimum size are obtained if adequate foam stabilizers are present so as to minimize partial collapse of the newly formed pores.

Inlets 11, 12 and 13 may be provided with valves 40, 41 and 42 respectively, to cut off the inflow of the liquid components into the head 10 when pumping is stopped. This prevents objectional gellation of components within the head and fouling of the same. Additionally, with the arrangement of the baffles means 35 in free standing relation to wall 23; the inner surface of said wall is free of projections therefrom which would tend to collect reactants in objectionable gelled or partially gelled form, which in turn would impair the mixed components which subsequently pass through the head.

When making a foam from polyesters and diisocyanates, the polyester in liquid form is passed into the head by way of upper inlet 11; a diisocyanate solution passes by way of inlet 12 and the catalyst such as a tertiary amine in aqueous solution is introduced by way of inlet 13.

It is understood that with the inlets 11, 12 and 13 in fairly close relation, and with thorough mixing attained by the action of the paddles 33 and baffle members 38, the liquid components may move through the head at a relatively high rate of speed and still react as required. Thus, in the case of the polyvinyl formal and the isocyanate-polyester foams, with temperatures fixed, solution time is finite. For the isocyanate-polyester foam at room temperatures, solution takes place in from 20 to 40 seconds and the throughput of the reactants is kept at between 10 to 25 pounds per minute. This insures adequate time for intermixture of the components, but is not long enough for any appreciable foaming even at the outlet nozzle 31.

In forming the polyvinyl formal foam, using gas expansion, the throughput of reactant may be in the range of from 10 to 30 pounds per minute. With a ½ liter capacity head, it has been found that the throughputs for the isocyanate-polyester mixture and the polyvinyl formal reaction, is about 12 and 20 pounds per minute respectively. For larger throughputs, the capacity of the head is correspondingly enlarged and with smaller throughputs, such head capacity is reduced, thereby keeping the passage time of the liquid components in the head substantially constant.

It has been found that in general, satisfactory rates of reaction are chosen if the maximum period of time between adding the final component in the mixing head 10 and the completion of expansion of the foam in mold 22 is preferably no greater than two minutes. Also, the maximum permissible time interval between the introduction of the last liquid component into head 10 and the ejection of the mixed components from outlet nozzle 31, is preferably from 10 to 20 seconds.

It will be apparent that the method and apparatus of the instant invention, while utilizing relative low pumping pressures for the several liquid components, allows the said components to be deposited rapidly in molds 22 where the finished foam is produced with a rapid final curing action.

With suitable regulation of the speed of motor 20 which drives the paddles 33, the pore size of the finished foam may be selected in accordance with the end use of the foam product, as for liquid or gas filters, cushioning material, heat and sound insulation, and the like.

The head 10 may be suitably arranged for movement in a uniform manner and determined pattern over mold 22 in order to effect proper deposition of the reactants in said mold, whether stationary or moving, all in a manner known in the art. The head may be moved in a straight line, reciprocatory manner when forming rectangular shaped foam blocks, or such head may be moved in a circular or elliptic path.

It has been found that the paddle members 33 may be rotated at speeds ranging from about 1500 to about 3000 r.p.m. and thereby produce foamed products with selected pore sizes. Thus, with the higher mixing speeds the average pores in the foam will be quite fine whereas with a decrease in such mixing speed, said pores become coarse and of increased average size.

Optimum pressure conditions within mixing head 10 are attained by adjusting the outlet valve 32. Normal pressures found in the head range between about 10 to 15 pounds per square inch.

We claim:

1. Apparatus for mixing a plurality of liquid chemical reactants adapted to react to form a foamed product comprising a single chambered cylindrical mixing head having a plurality of closely spaced inlets along the axis thereof and an outlet at the lower end thereof, a paddle shaft rotatably and axially mounted within said head, paddle members extending radially from said shaft toward the inner surface of said head, and radially disposed baffle members arranged about the inner surface of said head, said baffle members and paddle members having opposed edge portions in closely spaced relation.

2. Apparatus as in claim 1, and further including means for maintaining said baffle members in spaced relation to the inner surface of said head.

3. Apparatus as in claim 1, and further including means for interconnecting said baffle members, and means on said head for removably mounting said baffle connecting means.

4. Apparatus for forming synthetic foamed resin products from a plurality of liquid chemical reactants comprising a single chambered hollow mixing head, a plurality of closely spaced inlets on said head for respectively admitting said reactants to the interior of said head, an outlet from said head for ejecting the mixture of reactants, rotatable mixing impeller means within said head, stationary baffle means within said head in operative relation to said rotatble mixing impeller means for mechanically shearing the mixture of reactants within said head, and means for delivering said liquid chemical reactants respectively to said inlets at pressures not greater than 60 pounds per square inch.

5. Apparatus for forming synthetic foamed resin products from a plurality of liquid chemical reactants comprising a single chambered hollow mixing head, a plurality of closely spaced inlets on said head for respectively admitting said reactants to the interior of said head, an outlet from said head adjacent to said inlets, rotatable mixing means within said head, and means for delivering said liquid chemical reactants respectively to said inlets at pressures of not greater than 300 pounds per square inch.

6. Apparatus for forming synthetic foamed resin products from a plurality of liquid chemical reactants comprising a hollow mixing head, a plurality of inlets on said head for respectively admitting said reactants to the interior of said head, outlet means from said head, rotatable mixing means within said head presenting flat impelling surfaces, stationary baffle means presenting flat surfaces mounted within said head and means for delivering said liquid chemical reactants respectively to said inlets at pressures not exceeding about 60 pounds per square inch.

7. Apparatus as in claim 6 and including valve means on said outlet means operable to maintain a pressure within said head not greater than about 15 pounds per square inch.

References Cited by the Examiner

UNITED STATES PATENTS

| | | | |
|---|---|---|---|
| 1,716,363 | 6/1929 | Brooks | 259—107 |
| 2,706,108 | 4/1955 | Miner. | |
| 2,788,953 | 4/1957 | Schneider. | |
| 2,810,630 | 10/1957 | Herele | 23—285 |
| 2,860,377 | 11/1958 | Bernhardt et al. | 18—48 |
| 2,904,407 | 9/1959 | Rosenthal et al. | |
| 2,917,372 | 12/1959 | Wallin | 23—285 |
| 2,987,774 | 6/1961 | Jacobsen | 18—48 |

WILLIAM J. STEPHENSON, *Primary Examiner.*

MICHAEL V. BRINDISI, *Examiner.*

J. H. TAYMAN, P. E. ANDERSON,
*Assistant Examiners.*